United States Patent

Nuse

[15] 3,675,276
[45] July 11, 1972

[54] DEVICE FOR ATTACHING A FISH HOOK TO A FISHING LINE

[72] Inventor: Richard W. Nuse, Suite "O" 457 Washington, S.E., Albuquerque, N. Mex. 87108

[22] Filed: Dec. 1, 1970

[21] Appl. No.: 94,013

[52] U.S. Cl. ............................ 24/130, 43/42.49, 24/129 B
[51] Int. Cl. .......................................................... F16g 11/00
[58] Field of Search ............... 24/28, 129 B, 130, 129 R, 18; 43/42.49, 42.50, 44.83, 44.85; 26/27; 7/1

[56] References Cited

UNITED STATES PATENTS

| 757,820 | 4/1904 | Lykke | 24/130 |
| 1,806,162 | 5/1931 | Hahn | 24/18 |

FOREIGN PATENTS OR APPLICATIONS

| 30,631 | 12/1897 | Great Britain | 24/130 |
| 4,056 | 2/1897 | Great Britain | 24/130 |
| 1,270,992 | 1/1968 | Germany | 24/130 |

Primary Examiner—Bernard A. Gelak
Attorney—Pennie, Edmonds, Morton, Taylor & Adams

[57] ABSTRACT

A device for fastening a snelled fish hook to a primary fishing line comprising a flat member in which are formed two pairs of slots and two pairs of holes. The slots of each pair converge toward each other and toward the center of the member from the longitudinal sides thereof and the holes are disposed one pair on each side of the center and along the longitudinal axis of the member.

1 Claim, 3 Drawing Figures

PATENTED JUL 11 1972 3,675,276

INVENTOR
RICHARD W. NUSE

BY
ATTORNEYS

DEVICE FOR ATTACHING A FISH HOOK TO A FISHING LINE

FIELD OF THE INVENTION

This invention relates to devices for attaching hooks to fishing lines, particularly the attachment of a snelled hook to a fishing line.

BACKGROUND OF THE INVENTION

The attachment of snelled fish hooks (those having a short length of staging line connected to the hook) to primary fishing lines has occasioned considerable difficulty. When attached directly to a monofilament fishing line, snelled hooks frequently cause the line to break by the interaction of the monofilament line against itself. Various devices have been suggested for attaching hooks to lines; however, previous attachments are frequently complicated, requiring excessive effort to attach or detach the lines and do not wholly prevent line interaction or chafing.

Since monofilament line is very smooth it is difficult to provide an attachment without slippage, or in such a manner that snarling of the snelled hook with the primary line is eliminated.

It is a principal purpose of the present invention to provide a means for attaching snelled hooks to primary fishing lines which substantially obviates many of the difficulties attendant upon prior devices of this type.

The device of the invention is easily and economically manufactured of plastic in various dimensions, weights and composition of plastic material for adaptation to various sizes and weights of monofilament lines. Snelled hooks are readily attached to monofilament lines without the use of knots in the primary line and in a manner which will prevent slippage of the hook relative to the primary line, for example, during casting of live bait using a weighted monofilament primary line. The connection is such that the snelled hook will remain interconnected with the primary line in a manner which greatly militates against snarling.

SUMMARY OF THE INVENTION

The device for attaching a snelled fish hook to a primary fish line according to the present invention comprises in a preferred embodiment, an elongate flat plastic member having having spaced pairs of angularly oriented slots beginning outwardly at each end and running toward the center. The slots are wedge-shaped, narrowing toward their inner ends. At each end and along the longitudinal axis of the member are two holes for the passage of the staging and primary lines. These are looped at their ends and may pass over opposite ends of the member to be secured within the aforementioned angular slots such that the staging line and the primary line extend in opposite directions each along the longitudinal axis. By this means it is necessary only to form a loop at the terminal section of, or in a pre-determined position on, the primary line and employ the loop found on snelled hooks with the interposition of the device, in order to secure the snelled hook to the primary line.

Various aspects and advantages of the present invention will become apparent upon an examination of the following detailed description of a preferred embodiment and of the accompanying drawing.

DESCRIPTION OF THE PREFERRED EMBODIMENT

Figure 1:
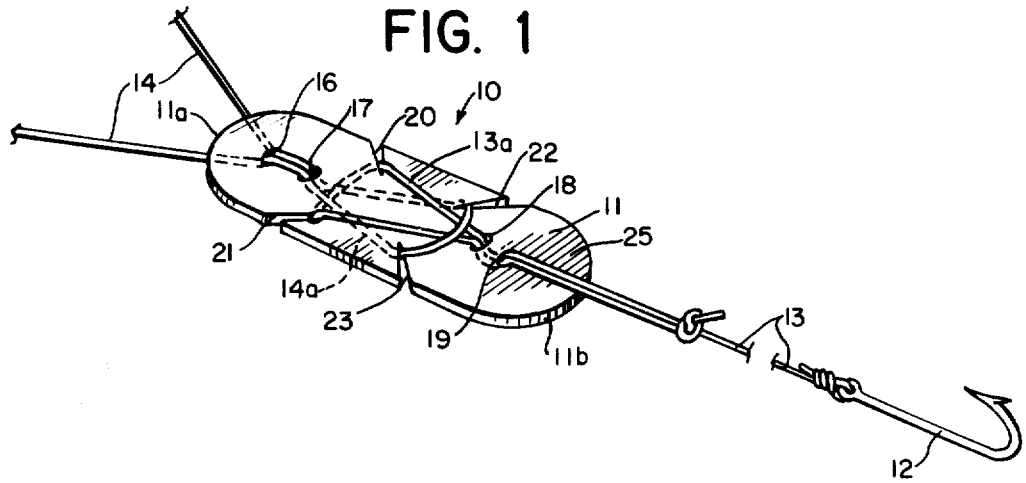
FIG. 1 is a perspective view of the device according to the present invention showing the respective attachment thereto of a snelled hook and a primary fishing line.

Referring to the drawing, a snelled fish hook attachment device constructed according to the principles of the present invention is generally indicated by reference numeral 10. The device 10 consists of a unitary member 11 which may be conveniently and economically mass-produced from a flat sheet of plastic material such as teflon. Reference numeral 12 designates a fish hook, snelled by the staging line 13. Line 14 is a primary fishing line to which the snelled hook 12 is to be attached.

The member 11 has along its longitudinal axis two pairs of holes 16, 17 and 18, 19, each respective pair being juxtaposed along the longitudinal axis adjacent to the ends 11a, 11b of the member 11. Two pairs of slots 20, 21 and 22, 23 are formed in the member 11 with each slot beginning on the periphery of the member 11 and toward ends 11a, 11b, then proceeding angularly inwardly toward the longitudinal axis and toward the center of the member 11. Preferably, the slots 20–23 are wedge-shaped with the inner ends thereof coming to a point.

Figure 2:
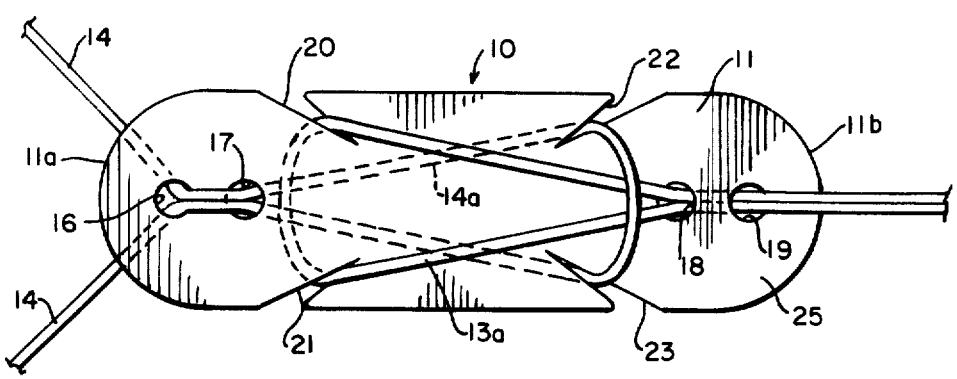
FIG. 2 is a plan view of the device shown in FIG. 1.
Figure 3:
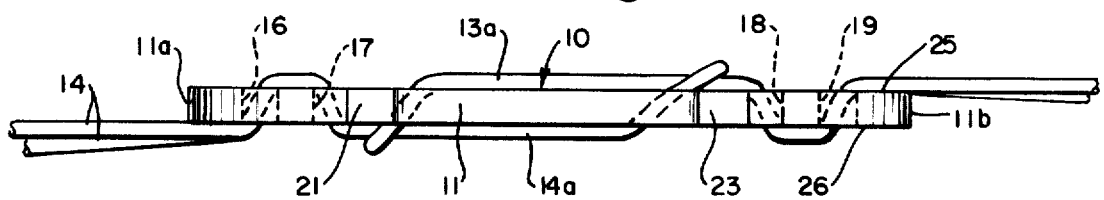
FIG. 3 is a side view device shown in FIG. 1.

As best seen in FIGS. 2 and 3, in order to attach the snelled hook 12 to the line 14, the loop on the snelled hook line 13a will first be passed along the upper surface 25 of the member 11 through the hole 19 and along the lower surface 26 to hole 18 where it again is passed along the upper surface 25. Thereafter, the free end of the loop line 13a will be passed over the end 11a of the member and drawn into slots 20 and 21 which will cause positive engagement to occur between the staging line 13 and the member 11 in a longitudinal direction.

In order to attach the primary line, a loop 14a in a preselected location on the primary line 14 will first be passed along the lower surface 26 of the member 11 through hole 16, then down through hole 17 to extend along the lower surface 26. The loop 14a may then be passed over the end of the hook 12 and the end 11b of the member 11, and can then be drawn into slots 22 and 23 to secure the loop 14a and the line 14 along the longitudinal access in the opposite direction to the snelled hook.

It will be seen that although the connection of the staging line 13 and primary line 14 is quite simple, each is interlockingly secured against movement with respect to the other through the interposition of the member 11. Thus the lines 13 and 14 cannot chafe. Furthermore, since each of the loops 13a and 14a are wedged within the respective pairs of slots 20, 21 and 22, 23, slippage of the loops is prevented since much of the force which would otherwise go into tending to produce such slippage, is absorbed by the gripping interaction of the slots 20, 21 and 22, 23 with the respective lines together with interaction opposite and longitudinally of lines 13 and 14 of the engaged loops.

It can be seen that the attachment device of the invention can be easily and economically mass-produced in different sizes and weights of various plastic compositions which will permit adaptation to the sizes and weights of monofilament lines. The attachment is furthermore very simple and completely fool proof. The device permits an in-line connection between the primary line and the staging line of a snelled hook which prevents the snelled hook from becoming angularly disoriented with respect to the primary line during casting so that the throwing of bait from the hook is minimized. Furthermore, the connection is such between the respective lines that the staging line will not easily snarl itself about the primary line.

It can further be seen that a number of snelled hooks can be attached to a primary line in such location as the user desires. Such attachment will enable the use of several hooks without danger of slippage, chafing, or breaking of monofilament lines by reason of the interaction of forces above recited.

It will be understood that the above description has related to a preferred embodiment of the invention and is therefore merely representative. In order to appreciate fully the spirit and scope of the present invention, reference should be made to the appended claims.

I claim:

1. A device for attaching a snelled fish hook to a primary fish line comprising a flat member having a longitudinal axis, two pairs of slots, the slots of each pair converging toward each other and extending toward the center of said member from the longitudinal sides thereof, and two pairs of holes disposed one pair on each side of said center adjacent each end of said device with all holes lying substantially on said longitudinal axis, whereby when a loop of the snell is passed successively through one pair of holes and is anchored in one pair of slots and a loop of the primary fish line is passed successively through the other pair of holes and is anchored in the other pair of slots said lines are interlocked substantially along the axis of said member.

* * * * *